(12) United States Patent
Zeng et al.

(10) Patent No.: US 12,170,363 B2
(45) Date of Patent: Dec. 17, 2024

(54) POSITIVE ACTIVE MATERIAL AND LITHIUM-ION BATTERY

(71) Applicant: Ningde Amperex Technology Limited, Fujian (CN)

(72) Inventors: Qiao Zeng, Fujian (CN); Kefei Wang, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

(21) Appl. No.: 17/847,801

(22) Filed: Jun. 23, 2022

(65) Prior Publication Data

US 2022/0336793 A1 Oct. 20, 2022

Related U.S. Application Data

(63) Continuation of application No. 16/249,888, filed on Jan. 16, 2019, now abandoned, which is a (Continued)

(30) Foreign Application Priority Data

Feb. 7, 2018 (CN) .......................... 201810123144.4
Jul. 16, 2018 (CN) .......................... 201810779137.X

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/505* (2013.01); *H01M 4/525* (2013.01); *H01M 10/0525* (2013.01); *H01M 2004/028* (2013.01)

(58) Field of Classification Search
CPC ...... H01M 4/364; H01M 4/505; H01M 4/525; H01M 10/0525; H01M 2004/028; H01M 4/131; Y02E 60/10
See application file for complete search history.

(56) References Cited

U.S. PATENT DOCUMENTS

2008/0193846 A1   8/2008   Morishima
2016/0190579 A1   6/2016   Sun et al.

FOREIGN PATENT DOCUMENTS

CN   1129610 A   8/1996
CN   1515042 A   7/2004
(Continued)

OTHER PUBLICATIONS

English Translation of JP2009110942 (Year: 2009).*
(Continued)

*Primary Examiner* — Andrew J. Oyer
(74) *Attorney, Agent, or Firm* — Maier & Maier, PLLC

(57) ABSTRACT

A positive active material including a first particle and a second particle. The first particle has a chemical formula of $Li_eCo_gM_{1-g}O_{2-i}$, and the second particle has a chemical formula of $Li_fCo_hN_{1-h}O_{2-j}$. M is at least two selected from the group of Ni, Mn, Al, Mg, Ti, La, Y and Zr. N is at least one selected from a group of Ni, Mn, Al, Mg, Ti, La, Y and Zr, and $0.8 \leq e \leq 1.2$, $0 < g < 1$, $-0.1 \leq i \leq 0.2$, $0.85 \leq f \leq 1.2$, $0 < h < 1$, $-0.1 \leq j \leq 0.2$, the number of types of the element M in the first particle is greater than the number of types of the element N in the second particles, the particle diameter of the positive active material meets the following formula (3):(Dv90-Dv50)-(Dv50-Dv10)≤2.5.

19 Claims, 2 Drawing Sheets

Related U.S. Application Data continuation of application No. PCT/CN2018/122758, filed on Dec. 21, 2018.

(51) Int. Cl.
  *H01M 4/505* (2010.01)
  *H01M 4/525* (2010.01)
  *H01M 10/0525* (2010.01)

(56) References Cited

FOREIGN PATENT DOCUMENTS

| | | |
|---|---|---|
| CN | 1685542 A | 10/2005 |
| CN | 1705517 A | 12/2005 |
| CN | 1855588 A | 11/2006 |
| CN | 101035743 A | 9/2007 |
| CN | 101188282 A | 5/2008 |
| CN | 101246957 A | 8/2008 |
| CN | 100583510 C | 1/2010 |
| CN | 101667663 A | 3/2010 |
| CN | 101685852 A | 3/2010 |
| CN | 101707252 A | 5/2010 |
| CN | 101714630 A | 5/2010 |
| CN | 102082269 A | 6/2011 |
| CN | 101232105 B | 8/2011 |
| CN | 102544474 A | 7/2012 |
| CN | 102958845 A | 3/2013 |
| CN | 102974541 A | 3/2013 |
| CN | 103367738 A | 10/2013 |
| CN | 103748711 A | 4/2014 |
| CN | 104016421 A | 9/2014 |
| CN | 105051945 A | 11/2015 |
| CN | 106450289 A | 2/2017 |
| CN | 206199668 U | 5/2017 |
| CN | 110729477 B | 7/2021 |
| EP | 3731314 A1 | 10/2020 |
| JP | 2000-082466 A | 3/2000 |
| JP | 2001185142 A | 7/2001 |
| JP | 2002-100356 A | 4/2002 |
| JP | 2006-294482 A | 10/2006 |
| JP | 2007302504 A | 11/2007 |
| JP | 2008-198465 A | 8/2008 |
| JP | 2009110942 A * | 5/2009 |
| JP | 2011-192541 A | 9/2011 |
| JP | 2012-054136 A | 3/2012 |
| KR | 1020100079535 A | 7/2010 |
| WO | 2019153909 A1 | 8/2019 |

OTHER PUBLICATIONS

Zeng, Qiao; International Search Report for PCT Application No. PCT/CN2018/122758, filed Dec. 21, 2018, mailed Mar. 20, 2019, 6 pages.

Zeng, Qiao; Office Action for Chinese Application No. 201810123144.4, filed Feb. 17, 2018, mailed May 21, 2020, 16 pages.

Zeng, Qiao; Office Action for Chinese Application No. 201810123144.4, filed Feb. 17, 2018, mailed Feb. 3, 2021, 16 pages.

Zeng, Qiao; Office Action for Chinese Application No. 201810779137.X, filed Jul. 16, 2018, mailed Apr. 2, 2021, 15 pages.

Zeng, Qiao; Office Action for Chinese Application No. 201810779137.X, filed Jul. 16, 2018, mailed Aug. 4, 2020, 17 pages.

Zeng, Qiao; Office Action for India Application No. 202037037297, filed Aug. 29, 2020, mailed Mar. 25, 2021, 7 pages.

Zeng, Qiao; Supplementary Search Report for European Application No. 18905006.5, filed Dec. 21, 2018, mailed Mar. 19, 2021, 8 pages.

Zeng, Qiao; Office Action for Canadian Application No. 3,090,720, filed Dec. 21, 2018, mailed Aug. 10, 2021, 4 pages.

Zeng, Qiao; Office Action for Chinese Application No. 201880088909.3, filed Dec. 21, 2018, mailed Nov. 19, 2021, 13 pages.

Zeng, Qiao; Office Action for Japanese Application No. 2020542410, filed Dec. 21, 2018, mailed Sep. 28, 2021, 6 pages.

Nad New Energy Technology Co. Ltd.; Office Action for Chinese Patent Application No. 201880088909.3, mailed Apr. 13, 2022, 12 pages.

Zeng, Qiao; Decision to Grant for Japanese Application No. 2020542410, filed Dec. 21, 2018, mailed Apr. 5, 2022, 6 pages.

Zeng, Qiao; Notification to Grant Patent for Chinese Application No. 201810779137.X, filed Jul. 16, 2018, mailed Jun. 29, 2021, 6 pages.

Nao New Energy Technology Co. Ltd.; Second Office Action for Chinese Patent Application No. 201880088909.3, mailed Jan. 26, 2022, 13 pages.

Zeng, Qiao; Notification to Grant Patent Right for Invention for Chinese Patent Application No. 201810123144.4, mailed May 11, 2021, 6 pages.

Zeng, Qiao; Office Action for Chinese Application No. 201810123144.4, filed Feb. 7, 2018, mailed Apr. 1, 2022, 7 pages.

Zeng, Qiao; Office Action in Canadian Patent Application No. 3090720, mailed Feb. 24, 2022, 4 pages.

Office Action issued on Aug. 23, 2023, in corresponding Chinese Application No. 201810779137.X, 31 pages (with partial English translation).

* cited by examiner

Example 1 SEM diagram

Comparative Example 6

12,170,363 B2

POSITIVE ACTIVE MATERIAL AND LITHIUM-ION BATTERY

CROSS-REFERENCE TO RELATED APPLICATION

This application is a continuation application of U.S. patent application Ser. No. U.S. Ser. No. 16/249,888, filed Jan. 16, 2019, and which is a continuation of International Application No. PCT/CN2018/122758, filed Dec. 21, 2018, entitled "Positive active material and lithium-ion battery", which claims priority to and benefits of Chinese Patent Application Serial No. 201810779137.X, filed with China National Intellectual Property Administration on Jul. 16, 2018, and Chinese Patent Application Serial No. 201810123144.4, filed with China National Intellectual Property Administration on Feb. 7, 2018, the entire contents of which are incorporated herein by reference.

TECHNICAL FIELD

The examples of the present application relate to the field of battery, in particular, to a positive active material and a lithium-ion battery.

BACKGROUND

Due to its long service life and high energy density, the lithium-ion battery is widely used in portable electronic products such as mobile phones, notebook computers, and digital cameras. It also has good application prospects in electric vehicles and other fields. With the expansion of its application range, higher requirements has also been put forward for the performance of the lithium-ion battery, in particular, with the popularization of smart phones, higher requirements has been put forward for the energy density of the lithium-ion battery.

However, when the energy density of the lithium-ion battery is increased, the service life of the lithium-ion battery is decreased. For this reason, there is an urgent need for a technical solution for improving the energy density of the lithium-ion battery without reducing its service life.

SUMMARY

In order to solve the defects in the prior art, examples of the present application provide a positive active material, which stabilizes the first particles by adjusting the type and content of the doping elements in the first particle and the second particle so that the discharge capacity retention rate at 500 cycles of lithium-ion battery is improved (discharge capacity retention rate at 500 cycles: ratio of discharge capacity at 500 cycles to initial discharge capacity).

According to the first aspect of the present application, a positive active material is provided, wherein the positive active material comprising a first particle and a second particle, wherein the first particle has a chemical formula of $Li_eCo_g M_{1-g}O_{2-i}$, and the second particle has a chemical formula of $Li_fCo_hN_{1-h}O_{2-j}$, the element M is at least two selected from a group consisting of Ni, Mn, Al, Mg, Ti, La, Y and Zr, the element N is at least one selected from a group consisting of Ni, Mn, Al, Mg, Ti, La, Y and Zr, and $0.8 \le e \le 1.2$, $0 < g < 1$, $-0.1 \le i \le 0.2$, $0.85 \le f \le 1.2$, $0 < h < 1$, $-0.1 \le j \le 0.2$, the number of types of the element M in the first particle is greater than the number of types of the element N in the second particles.

In above positive active material, the first particle has a chemical formula of $Li_nCo_x M_{1-x}O_{2-y}$, and the second particle has a chemical formula of $Li_nCo_xN_{1-x}O_{2-y}$, and $0.8 \le n \le 1.2$, $0 < x < 1$, $-0.1 \le y \le 0.2$.

In above positive active material, the particle diameter of the first particle is smaller than the particle diameter of the second particle.

In above positive active material, the particle diameter of the first particle is smaller than Dv50 of the positive active material, and the particle diameter of the second particle is larger than Dv50 of the positive active material.

In above positive active material, wherein each of the elements M is contained in the first particle in an amount of more than 200 ppm and each of the elements N is contained in the second particle in an amount of more than 200 ppm.

In above positive active material, the positive active material meets the following equation (1):

$$(a/b)/(c/d) > 1 \qquad \text{equation (1)}$$

a represents the total mass of the element M in the first particle;

b represents the mass of the element Co in the first particle;

c represents the total mass of the element N in the second particle;

d represents the mass of the element Co in the second particle.

In above positive active material, the positive active material meets the following equation (2):

$$(A/B)/(C/D) > 1 \qquad \text{equation (2)}$$

A represents the total molar amount of the element M in the first particle;

B represents the molar amount of the element Co in the first particle;

C represents the total molar amount of the element N in the second particle;

D represents the molar amount of the element Co in the second particle.

In above positive active material, the positive active material has a value of (a/b)/(c/d) of 1.3 to 10.

In above positive active material, the volume-based particle size distribution curve of the positive active material comprises a first peak and a second peak.

In above positive active material, the peak height of the second peak is greater than the peak height of the first peak.

In above positive active material, the particle diameter of the positive active material meets the following equation (3):

$$(Dv90-Dv50)-(Dv50-Dv10) \le 2.5 \qquad \text{equation (3)}$$

According to the second aspect of the present application, a positive electrode is further provided, wherein the positive electrode comprises the positive active material according to the first aspect of the present application.

In above positive electrode, the compact density of the positive electrode after pressing is $\ge 3.9$ g/cm$^3$.

According to the third aspect of the present application, a lithium-ion battery is further provided, wherein it comprises the positive electrode according to the second aspect of the present application.

DETAILED DESCRIPTION

Figure 1A:
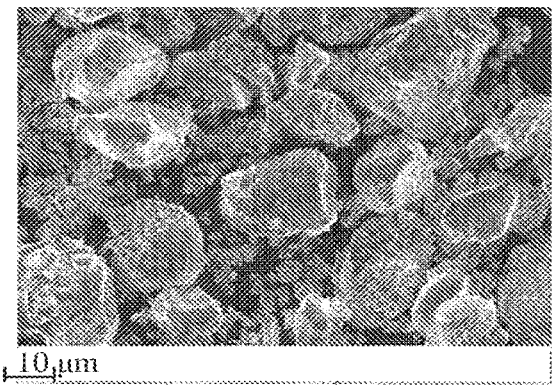
FIG. 1A shows a scanning electron microscope (SEM) comparison view of the positive active material according to Example 1 of the present application.

The exemplary examples are described in sufficient detail below, but these exemplary examples may be implemented in various ways and should not be construed as being limited to the examples set forth herein. Rather, these examples are provided so that the present application will be thorough and complete and the scope of the present application is fully conveyed to those skilled in the art.

In the present application, a positive active material is provided, the positive active material comprising a first particle and a second particle, wherein the first particle has a chemical formula of $Li_eCo_g M_{1-g}O_{2-i}$, and the second particle has a chemical formula of $Li_fCo_hN_{1-h}O_{2-j}$, the element M is at least two selected from a group consisting of Ni, Mn, Al, Mg, Ti, La, Y and Zr, the element N is at least one selected from a group consisting of Ni, Mn, Al, Mg, Ti, La, Y and Zr, and $0.8 \leq e \leq 1.2$, $0 < g < 1$, $-0.1 \leq i \leq 0.2$, $0.85 \leq f \leq 1.2$, $0 < h < 1$, $-0.1 \leq j \leq 0.2$, the number of types of the element M in the first particle is greater than the number of types of the element N in the second particles.

In some examples of the present application, the first particle has a chemical formula of $Li_nCo_x M_{1-x}O_{2-y}$, and the second particle has a chemical formula of $Li_nCo_xN_{1-x}O_{2-y}$, and $0.8 \leq n \leq 1.2$, $0 < x < 1$, $-0.1 \leq y \leq 0.2$.

The particle diameter of the first particle in the positive active material is smaller than that of the second particle, and the blending of the particles of different sizes may increase the compact density of the positive electrode, thereby improving the energy density of the lithium-ion battery. However, the first particle has a small particle diameter, a large specific surface area, a strong activity, and is liable to cause side reactions with the electrolyte, so that the stability of the entire positive active material is lowered and the service life of the lithium-ion battery is shortened. In some examples of the present application, the number of types of the element M in the first particle is greater than the number of types of the element M in the second particles, so the first particle having a smaller particle diameter may be effectively stabilized and the side reaction of the first particle with the electrolyte may be suppressed so that the service life of the lithium-ion battery is improved.

In some examples of the present application, each of the elements M is contained in the first particle in an amount of more than 200 ppm and each of the elements N is contained in the second particle in an amount of more than 200 ppm. The content of the M element and the N element may be detected by ICP (Inductively Coupled Plasma Spectrometer). If the content of each element in the elements M is less than 200 ppm, the element M may not function to stabilize the first particle and if the content of each element in the elements N is less than 200 ppm, the element N may not function to stabilize the second particle.

In some examples of the present application, the positive active material meets the following equation (1):

$$(a/b)/(c/d) > 1 \qquad \text{equation (1)}$$

wherein a represents the total mass of the element M in the first particle; b represents the mass of the element Co in the first particle; c represents the total mass of the element N in the second particle; d represents the mass of the element Co in the second particle.

In some examples of the present application, the positive active material meets the following equation (2):

$$(A/B)/(C/D) > 1 \qquad \text{equation (2)}$$

wherein A represents the total molar amount of the element M in the first particle; B represents the molar amount of the element Co in the first particle; C represents the total molar amount of the element N in the second particle; D represents the molar amount of the element Co in the second particle.

The first particle and the second particle meeting the equation (1) or the equation (2) allows the element M to fully exert its effect. The content of the element M corresponding to the element Co of per unit in the first particle with a smaller particle diameter is larger than the content of the element N corresponding to the element Co of per unit in the second particle with a larger particle diameter. The smaller the particle diameter of the particle, the larger the specific surface area and the stronger the activity. So in order to achieve the purpose of stabilizing the first particle having a smaller particle diameter, more doping or coating of the element M is required for the first particle so as to reduce side reactions of the first particle with the electrolyte, making the first particle more stable. Thereby, the capacity retention rate of the lithium-ion battery is improved, while the second particle having a larger particle diameter requires a relatively small amount of the element N to achieve a stable effect.

In some examples of the present application, the positive active material has a value of $(a/b)/(c/d)$ of 1.3 to 10. In order to make the first particle more stable without reducing the content of the host material in the positive active material, the content of the element M and the element N in the particles of the positive active material should not be too low or too high. When the content of the element M in the first particle and the content of the element N in the second particle meet $(a/b)/(c/d)$ of 1.3 to 10, a balance may be achieved, and at this time, the comprehensive performance of the lithium-ion battery is good.

In some examples of the present application, the volume-based particle size distribution curve of the positive active material comprises a first peak and a second peak; the peak height of the second peak is greater than the peak height of the first peak. The positive active material having such a particle size distribution curve indicates that the particles are concentrated near the particle diameters corresponding to the first peak and the second peak. That is to say, there are many particles in the vicinity of the corresponding particle diameters of the first peak and the second peak, and the particle diameter corresponding to the first peak and the particle diameter corresponding to the second peak are different with one being large and another one being small; and after two particles are mixed, the particles with smaller particle diameter occupy the gap between the particles with larger particle diameter, thereby increasing the compact density of the positive electrode so as to increase the energy density of the lithium-ion battery.

In some examples of the present application, the particle diameter of the positive active material meets the following equation (3):

$$(Dv90 - Dv50) - (Dv50 - Dv10) \leq 2.5 \qquad \text{equation (3)}$$

Dv90 refers to a particle diameter reaching a volume accumulation of 90% from the small particle diameter side in the volume-based particle size distribution. Dv50 refers to a particle diameter reaching a volume accumulation of 50% from the small particle diameter side in the volume-based particle size distribution. Dv10 refers to a particle diameter reaching a volume accumulation of 10% from the small particle diameter side in the volume-based particle size distribution.

The positive active material meeting the equation (3) may increase the compact density of the positive electrode, thereby increasing the energy density of the lithium-ion battery.

The present application also provides a positive electrode comprising the above positive active material, and a compact density of the positive electrode after pressing is ≥3.9 g/cm³.

The present application also provides a lithium-ion battery comprising the above positive electrode, the lithium-ion battery further comprising a negative electrode containing a negative active material layer, an electrolyte, and a separator between the positive electrode and the negative electrode. The positive electrode comprises a positive active material layer and a positive electrode current collector. The positive electrode current collector may be an aluminum foil and a nickel foil. The negative electrode comprises a negative active material layer and a negative electrode current collector. The negative electrode current collector may be a copper foil or a nickel foil.

The negative electrode comprises a negative electrode material capable of intercalation/deintercalation of lithium (hereinafter, sometimes referred to as "negative electrode material capable of intercalation/deintercalation of lithium"). Examples of the negative electrode material capable of intercalation/deintercalation of lithium may comprise carbon materials, metal compounds, oxides, sulfides, nitrides of lithium such as $LiN_3$, lithium metal, metals which form alloys together with lithium and polymer materials.

Examples of carbon materials may comprise low graphitized carbon, easily graphitizable carbon, artificial graphite, natural graphite, mesocarbon microbeads, soft carbon, hard carbon, pyrolytic carbon, coke, vitreous carbon, organic polymer compound sintered body, carbon fiber and activated carbon. Among them, coke may comprise pitch coke, needle coke, and petroleum coke. The organic polymer compound sintered body refers to a material obtained by calcining a polymer material such as a phenol plastic or a furan resin at a suitable temperature for carbonizing, and some of these materials are classified into low graphitized carbon or easily graphitizable carbon. Examples of the polymer material may comprise polyacetylene and polypyrrole.

Further, in the negative electrode material capable of intercalation/deintercalation of lithium, a material whose charging and discharging voltages are close to the charging and discharging voltages of lithium metal is selected. This is because the lower the charging and discharging voltage of the negative electrode material, the easier for the battery to have a higher energy density. Among them, the negative electrode material may be selected from carbon materials because their crystal structures are only slightly changed upon charging and discharging, and therefore, good cycle characteristics as well as large charge and discharge capacities may be obtained. In particular, graphite may be selected because it gives a large electrochemical equivalent and a high energy density.

In addition, the negative electrode material capable of intercalation/deintercalation of lithium may comprise elemental lithium metal, metal elements and semimetal elements capable of forming an alloy together with lithium, and alloys and compounds comprising such metal elements and semimetal elements. In particular, they are used together with carbon materials because in this case, good cycle characteristics as well as high energy density may be obtained. In addition to alloys comprising two or more metal elements, the alloys used herein also comprise alloys comprising one or more metal elements and one or more semi-metal elements. The alloy may be in the form of a solid solution, a eutectic crystal (eutectic mixture), an intermetallic compound, and a mixture thereof.

Examples of the metal element and the semi-metal element may comprise tin (Sn), lead (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), yttrium (Y), and hafnium (Hf). Examples of above alloys and compounds may comprise a material having a chemical formula $Ma_s Mb_t Li_u$ and a material having a chemical formula $Ma_p Mc_q Md_r$. In these chemical formulae, Ma is at least one selected from a group consisting of metal element and semi-metal element capable of forming an alloy together with lithium; Mb is at least one selected from a group consisting of metal element and semi-metal element other than lithium and Ma; Mc is at least one selected from the non-metallic elements; Md is at least one selected from a group of metal element and semi-metal element other than Ma; and s, t, u, p, q and r meets: s>0, t≥0, u≥0, p>0, q>0 and r≥0.

Further, an inorganic compound not comprising lithium such as $MnO_2$, $V_2O_5$, $V_6O_{13}$, NiS, and MoS may be used in the negative electrode.

The above lithium-ion battery further comprises an electrolyte which may be one or more selected from a group consisting of a gel electrolyte, a solid electrolyte and an electrolytic solution, and the electrolytic solution comprises a lithium salt and a non-aqueous solvent.

The lithium salt comprises at least one selected from a group of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt is $LiPF_6$ because it may provide high ionic conductivity and improved cycle characteristics.

The non-aqueous solvent may be a carbonate compound, a carboxylate compound, an ether compound, other organic solvents, or a combination thereof.

The carbonate compound may be a chain carbonate compound, a cyclic carbonate compound, a fluorocarbonate compound, or a combination thereof.

Examples of the chain carbonate compound are diethyl carbonate (DEC), dimethyl carbonate (DMC), dipropyl carbonate (DPC), methylpropyl carbonate (MPC), ethylene propyl carbonate (EPC), and methyl ethyl carbonate (MEC) and combinations thereof.

Examples of the cyclic carbonate compound are ethylene carbonate (EC), propylene carbonate (PC), butylene carbonate (BC), vinyl ethylene carbonate (VEC), and combinations thereof.

Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2- trifluoro-2-methylethylene carbonate, trifluoromethylethylene carbonate, and combinations thereof.

Examples of the carboxylate compound are methyl acetate, ethyl acetate, n-propyl acetate, t-butyl acetate, methyl propionate, ethyl propionate, propyl propionate, γ-butyrolactone, azlactone, valerolactone, caprolactone, methyl formate and combinations thereof.

Examples of the ether compounds are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate, and combinations thereof.

Examples of the separator are polyethylene, polypropylene, polyethylene terephthalate, polyimide, aramid and combinations thereof, wherein the polyethylene is selected from the group consisting of high density polyethylene, low density polyethylene, ultra high molecular weight polyethylene, and combinations thereof. In particular, polyethylene and polypropylene, which have a good effect on preventing short circuits, may improve the stability of the battery by the shutdown effect.

The separator surface may further comprise a porous layer arranged on the surface of the separator, the porous layer comprising inorganic particles and a binder. The inorganic particle is selected from a group consisting of alumina ($Al_2O_3$), silica ($SiO_2$), magnesia (MgO), titania ($TiO_2$), hafnium oxide ($HfO_2$), tin oxide ($SnO_2$), cerium oxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, barium sulfate and combinations thereof. The binder is selected from the group consisting of polyvinylidene fluoride, a copolymer of vinylidene fluoride-hexafluoropropylene, polyamide, polyacrylonitrile, polyacrylate, polyacrylic acid, polyacrylate, sodium carboxymethylcellulose, polyvinylpyrrolidone, polyvinyl ether, polymethylmethacrylate, polytetrafluoroethylene, polyhexafluoropropylene and combinations thereof.

The porous layer on the surface of the separator may improve the heat resistance, oxidation resistance and electrolyte wetting property of the separator, and enhance the adhesion between the separator and the electrode.

Although the above is exemplified by a lithium-ion battery, those skilled in the art can understand that the positive active material of the present application may be used for other suitable electrochemical devices after reading the present application. Such electrochemical devices comprise any devices that generate an electrochemical reaction, and specific examples thereof comprise all kinds of primary batteries, secondary batteries or capacitors. In particular, the electrochemical device is a lithium secondary battery comprising a lithium metal battery, a lithium-ion battery, and a lithium polymer battery.

Hereinafter, a lithium-ion battery is taken as an example and a preparation of the lithium-ion battery is described in conjunction with specific examples. Those skilled in the art will understand that the preparation method described in the present application is merely an example, and any other suitable preparation methods are within the scope the present application.

Some specific examples and comparative examples are listed below to better illustrate the application.

Example 1

A solution containing a precipitating agent (sodium carbonate), a solution of a Co salt (cobalt sulfate) and a solution of a metal M salt (magnesium nitrate, aluminum nitrate) are cocurrent flowed and added into a reactor for fully mixing to obtain a precipitate by coprecipitation reaction; the precipitate is filtered, dried, and calcined at 780 to 1200° C. to form a precursor; subsequently, the precursor and lithium carbonate are mixed in a certain ratio, and calcined at 920 to 1200° C., wherein the element M is Mg and Al with a content of 211 ppm for each element M; then, a grinding process is performed to remove particles having a particle diameter of more than 12 μm to obtain a first positive active material having a particle diameter of 12 μm or less.

A solution containing a precipitating agent (sodium carbonate), a solution of a Co salt (cobalt sulfate) and a solution of a metal N salt (aluminum nitrate) are cocurrent flowed and added into a reactor for fully mixing to obtain a precipitate by coprecipitation reaction; the precipitate is filtered, dried, and calcined at 780 to 1200° C. to form a precursor; subsequently, the precursor and lithium carbonate are mixed in a certain ratio, and calcined at 920 to 1200° C., wherein the element N is Al with a content of 231 ppm; then, a grinding process is performed to remove particles having a particle diameter of less than 10 μm to obtain a second positive active material having a particle diameter of 10 μm or more.

The two positive active materials (the first positive active material and the second positive active material) prepared by the above method are uniformly mixed in a ratio of 3:7 to obtain a desired positive active material.

The obtained above positive active material, a conductive agent of acetylene black, and a binder of polyvinylidene fluoride (PVDF) are sufficiently stirred and uniformly mixed in a N-methylpyrrolidone solvent system at a mass ratio of 94:3:3, and then coated on a positive electrode current collector of Al foil for drying, pressing, and cutting to obtain a positive electrode.

Using the copper foil as the negative electrode current collector, a layer of graphite slurry is uniformly coated on the surface of the copper foil, and the slurry is constituted by 97.7 wt % artificial graphite, 1.3 wt % sodium carboxymethyl cellulose (CMC), and 1.0 wt % styrene butadiene rubber (SBR). Then drying was performed at 85° C., followed by pressing, cutting, slitting, and drying under a vacuum condition of 85° C. for 4 h to prepare a negative electrode.

In a dry argon environment, $LiPF_6$ is dissolved, in a manner of with a concentration of 1.2 M, into a non-aqueous solvent in which ethylene carbonate (EC), ethyl methyl carbonate (EMC), and diethyl carbonate (DEC) are mixed in an amount of 30 wt %, 40 wt %, or 30 wt %, respectively, and then 1 wt % of vinylene carbonate and 5 wt % of fluoroethylene carbonate are added, to obtain an electrolyte.

The positive electrode and the negative electrode are wound, and the positive electrode and the negative electrode are separated by a PE separator, to prepare a wound electrode assembly. After sealing at top side, spraying, vacuum drying, injecting with the electrolyte and standing at a high temperature for the electrode assembly, a finished lithium-ion battery may be obtained by chemical conversion and capacity.

The lithium-ion battery is discharged to 2.5-3.0V after repeated cycles. Then the lithium-ion battery is disassembled to take out the positive electrode. The positive electrode is immersed in dimethyl carbonate for 2 h or rinsed with dimethyl carbonate, then dried naturally in a dry room, and baked in a muffle furnace at 600° C. for 2 h. Next, the positive electrode is pulverized and sieved with a 200-mesh sieve to obtain a sample of the positive active material required for the test (the ICP, SEM, and EDS mentioned below are all tested for the sample prepared by the method).

The Dv10 obtained by the laser particle diameter tester (Thermal ICP6300) is 5.70 μm, the Dv50 is 17.60 μm and the Dv90 is 32.90 μm. The value of (Dv90-Dv50)−(Dv50-Dv10) calculated according to equation (3) is 3.4. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8. If only qualitative analysis is performed, an energy spectrometer (EDS, Zeiss SIGMA+X-maxEDS) test may be used to initially determine the content of element M in the first particle and the content of the element N the second particle.

Example 2

The method here is the same as the preparation method of Example 1, except that the elements M in the first positive active material in Example 2 are Ti and Al, and the element N in the second positive active material is Mg.

Example 3

The method here is the same as the preparation method of Example 1, except that the elements M in the first positive active material in Example 3 are Ti, Al and Mg, and the elements N in the second positive active material are Mg and Al.

Example 4

The method here is the same as the preparation method of Example 1, except that the elements M in the first positive active material in Example 4 are Ti, Al, Mg and Mn, and the elements N in the second positive active material are Mg and Al.

Example 5

The method here is the same as the preparation method of Example 1, except that the elements M in the first positive active material in Example 5 are Ni, Al, Mg, Mn and Zr, and the elements N in the second positive active material are Mg, Al and Mn.

Example 6

The method here is the same as the preparation method of Example 1, except that the elements M in the first positive active material in Example 6 are Ti, Al, Mg, Mn and Ni, and the elements N in the second positive active material are Mg and Ti.

Example 7

The method here is the same as the preparation method of Example 1, except that the elements M in the first positive active material in Example 7 are Ti, Al, Mg, Mn and Ni, and the elements N in the second positive active material are Mg, Al and Mn.

Example 8

The method here is the same as the preparation method of Example 1, except that the elements M in the first positive active material in Example 8 are Ti, Al, Mg, Mn, Ni and Zr, and the elements N in the second positive active material are Mg, Al, Mn and Ni.

Example 9

The method here is the same as the preparation method of Example 1, except that the elements M in the first positive active material in Example 9 are Ti, Al, Mg, Mn, Ni, Zr and La, and the elements N in the second positive active material are Mg, Al and Mn.

Example 10

The method here is the same as the preparation method of Example 1, except that the elements M in the first positive active material in Example 10 are Ti, Al, Mg, Mn, Ni, Zr and La, and the elements N in the second positive active material are Mg, Al, Ni and Mn.

Example 11

The method here is the same as the preparation method of Example 1, except that the elements M in the first positive active material in Example 11 are Ti, Al, Mg, Mn, and Ni with a content for each of them being 293 ppm, and a grinding process is performed to remove particles having a particle diameter of more than 11 μm to obtain a first positive active material having a particle diameter of 11 μm or less. The elements N in the second positive active material are Mg, Al and Mn with a content for each of them being 287 ppm, and a grinding process is performed to remove particles having a particle diameter of less than 9.3 μm to obtain a second positive active material having a particle diameter of 9.3 μm or more.

The Dv10 obtained by the laser particle diameter tester is 5.20 μm, the Dv50 is 15.30 μm and the Dv90 is 28.40 μm. The value of (Dv90-Dv50)−(Dv50-Dv10) calculated according to equation (3) is 3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 1.2.

Example 12

The method here is the same as the preparation method of Example 1, except that the elements M in the first positive active material in Example 12 are Ti, Al, Mg, Mn, and Ni with a content for each of them being 376 ppm, and a grinding process is performed to remove particles having a particle diameter of more than 11 μm to obtain a first positive active material having a particle diameter of 11 μm or less. The elements N in the second positive active material are Mg, Al and Mn with a content for each of them being 311 ppm, and a grinding process is performed to remove particles having a particle diameter of less than 9.3 µm to obtain a second positive active material having a particle diameter of 9.3 µm or more.

The Dv10 obtained by the laser particle diameter tester is 5.20 µm, the Dv50 is 15.30 µm and the Dv90 is 28.40 µm. The value of (Dv90-Dv50)–(Dv50-Dv10) calculated according to equation (3) is 3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 3.7.

Example 13

The method here is the same as the preparation method of Example 1, except that the elements M in the first positive active material in Example 13 are Ti, Al, Mg, Mn, and Ni with a content for each of them being 528 ppm, and a grinding process is performed to remove particles having a particle diameter of more than 11 µm to obtain a first positive active material having a particle diameter of 11 µm or less. The elements N in the second positive active material are Mg, Al and Mn with a content for each of them being 449 ppm, and a grinding process is performed to remove particles having a particle diameter of less than 9.3 µm to obtain a second positive active material having a particle diameter of 9.3 µm or more.

The Dv10 obtained by the laser particle diameter tester is 5.20 µm, the Dv50 is 15.30 µm and the Dv90 is 28.40 µm. The value of (Dv90-Dv50)–(Dv50-Dv10) calculated according to equation (3) is 3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 6.9.

Example 14

The method here is the same as the preparation method of Example 1, except that the elements M in the first positive active material in Example 14 are Ti, Al, Mg, Mn, and Ni with a content for each of them being 689 ppm, and a grinding process is performed to remove particles having a particle diameter of more than 11 µm to obtain a first positive active material having a particle diameter of 11 µm or less. The elements N in the second positive active material are Mg, Al and Mn with a content for each of them being 574 ppm, and a grinding process is performed to remove particles having a particle diameter of less than 9.3 µm to obtain a second positive active material having a particle diameter of 9.3 µm or more.

The Dv10 obtained by the laser particle diameter tester is 5.20 µm, the Dv50 is 15.30 µm and the Dv90 is 28.40 µm. The value of (Dv90-Dv50)–(Dv50-Dv10) calculated according to equation (3) is 3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 9.5.

Example 15

The method here is the same as the preparation method of Example 1, except that the elements M in the first positive active material in Example 15 are Ti, Al, Mg, Mn, and Ni with a content for each of them being 823 ppm, and a grinding process is performed to remove particles having a particle diameter of more than 11 µm to obtain a first positive active material having a particle diameter of 11 µm or less. The elements N in the second positive active material are Mg, Al and Mn with a content for each of them being 679 ppm, and a grinding process is performed to remove particles having a particle diameter of less than 9.3 µm to obtain a second positive active material having a particle diameter of 9.3 µm or more.

The Dv10 obtained by the laser particle diameter tester is 5.20 µm, the Dv50 is 15.30 µm and the Dv90 is 28.40 µm. The value of (Dv90-Dv50)–(Dv50-Dv10) calculated according to equation (3) is 3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 16.9.

Example 16

The method here is the same as the preparation method of Example 1, except that the elements M in the first positive active material in Example 16 are Ti, Al, Mg, Mn, and Ni with a content for each of them being 1321 ppm, and a grinding process is performed to remove particles having a particle diameter of more than 11 µm to obtain a first positive active material having a particle diameter of 11 µm or less. The elements N in the second positive active material are Mg, Al and Mn with a content for each of them being 972 ppm, and a grinding process is performed to remove particles having a particle diameter of less than 9.3 µm to obtain a second positive active material having a particle diameter of 9.3 µm or more.

The Dv10 obtained by the laser particle diameter tester is 5.20 µm, the Dv50 is 15.30 µm and the Dv90 is 28.40 µm. The value of (Dv90-Dv50)–(Dv50-Dv10) calculated according to equation (3) is 3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 23.6.

Example 17

The method here is the same as the preparation method of Example 1, except that the each content of elements M in the first positive active material in Example 17 is 303 ppm, and a grinding process is performed to remove particles having a particle diameter of more than 11 µm to obtain a first positive active material having a particle diameter of 11 µm or less. The each content of elements N in the second positive active material is 292 ppm, and a grinding process is performed to remove particles having a particle diameter of less than 9.3 µm to obtain a second positive active material having a particle diameter of 9.3 µm or more.

The Dv10 obtained by the laser particle diameter tester is 2.50 µm, the Dv50 is 14.70 µm and the Dv90 is 28.50 µm. The value of (Dv90-Dv50)–(Dv50-Dv10) calculated according to equation (3) is 1.6. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 18

The method here is the same as the preparation method of Example 2, except that the each content of elements M in the first positive active material in Example 18 is 303 ppm, and a grinding process is performed to remove particles having a particle diameter of more than 11 µm to obtain a first positive active material having a particle diameter of 11 µm or less. The each content of elements N in the second positive active material is 292 ppm, and a grinding process is performed to remove particles having a particle diameter of less than 7 µm to obtain a second positive active material having a particle diameter of 7 µm or more.

The Dv10 obtained by the laser particle diameter tester is 1.90 µm, the Dv50 is 11.50 µm and the Dv90 is 23.50 µm. The value of (Dv90-Dv50)−(Dv50-Dv10) calculated according to equation (3) is 2.4. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 19

The method here is the same as the preparation method of Example 3, except that The each content of elements M in the first positive active material in Example 19 is 303 ppm, and a grinding process is performed to remove particles having a particle diameter of more than 13 µm to obtain a first positive active material having a particle diameter of 13 µm or less. The each content of elements N in the second positive active material is 292 ppm, and a grinding process is performed to remove particles having a particle diameter of less than 11 µm to obtain a second positive active material having a particle diameter of 11 µm or more.

The Dv10 obtained by the laser particle diameter tester is 2.70 µm, the Dv50 is 17.20 µm and the Dv90 is 26.40 µm. The value of (Dv90-Dv50)−(Dv50-Dv10) calculated according to equation (3) is −5.3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 20

The method here is the same as the preparation method of Example 4, except that The each content of elements M in the first positive active material in Example 20 is 303 ppm, and a grinding process is performed to remove particles having a particle diameter of more than 11 µm to obtain a first positive active material having a particle diameter of 11 µm or less. The each content of elements N in the second positive active material is 292 ppm, and a grinding process is performed to remove particles having a particle diameter of less than 9.3 µm to obtain a second positive active material having a particle diameter of 9.3 µm or more.

The Dv10 obtained by the laser particle diameter tester is 2.5 µm, the Dv50 is 14.70 µm and the Dv90 is 28.50 µm. The value of (Dv90-Dv50)−(Dv50-Dv10) calculated according to equation (3) is 1.6. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 21

The method here is the same as the preparation method of Example 5, except that The each content of elements M in the first positive active material in Example 21 is 303 ppm, and a grinding process is performed to remove particles having a particle diameter of more than 13 µm to obtain a first positive active material having a particle diameter of 13 µm or less. The each content of elements N in the second positive active material is 292 ppm, and a grinding process is performed to remove particles having a particle diameter of less than 11 µm to obtain a second positive active material having a particle diameter of 11 µm or more.

The Dv10 obtained by the laser particle diameter tester is 3.70 µm, the Dv50 is 17.20 µm and the Dv90 is 32.0 µm. The value of (Dv90-Dv50)−(Dv50-Dv10) calculated according to equation (3) is 1.3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 22

The method here is the same as the preparation method of Example 6, except that The each content of elements M in the first positive active material in Example 22 is 303 ppm, and a grinding process is performed to remove particles having a particle diameter of more than 15 µm to obtain a first positive active material having a particle diameter of 15 µm or less. The each content of elements N in the second positive active material is 292 ppm, and a grinding process is performed to remove particles having a particle diameter of less than 12 µm to obtain a second positive active material having a particle diameter of 12 µm or more.

The Dv10 obtained by the laser particle diameter tester is 4.10 µm, the Dv50 is 18.50 µm and the Dv90 is 32.90 µm. The value of (Dv90-Dv50)−(Dv50-Dv10) calculated according to equation (3) is 0. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 23

The method here is the same as the preparation method of Example 7, except that The each content of elements M in the first positive active material in Example 23 is 303 ppm, and a grinding process is performed to remove particles having a particle diameter of more than 6 µm to obtain a first positive active material having a particle diameter of 6 µm or less. The each content of elements N in the second positive active material is 292 ppm, and a grinding process is performed to remove particles having a particle diameter of less than 5 µm to obtain a second positive active material having a particle diameter of 5 µm or more.

The Dv10 obtained by the laser particle diameter tester is 1.50 µm, the Dv50 is 9.70 µm and the Dv90 is 20.20 µm. The value of (Dv90-Dv50)−(Dv50-Dv10) calculated according to equation (3) is 2.3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 24

The method here is the same as the preparation method of Example 8, except that The each content of elements M in the first positive active material in Example 24 is 303 ppm, and a grinding process is performed to remove particles having a particle diameter of more than 13 μm to obtain a first positive active material having a particle diameter of 13 μm or less. The each content of elements N in the second positive active material is 292 ppm, and a grinding process is performed to remove particles having a particle diameter of less than 11 μm to obtain a second positive active material having a particle diameter of 11 μm or more.

The Dv10 obtained by the laser particle diameter tester is 3.20 μm, the Dv50 is 17 μm and the Dv90 is 33.30 μm. The value of (Dv90-Dv50)–(Dv50-Dv10) calculated according to equation (3) is 2.5. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 25

The method here is the same as the preparation method of Example 9, except that The each content of elements M in the first positive active material in Example 25 is 303 ppm, and a grinding process is performed to remove particles having a particle diameter of more than 11 μm to obtain a first positive active material having a particle diameter of 11 μm or less. The each content of elements N in the second positive active material is 292 ppm, and a grinding process is performed to remove particles having a particle diameter of less than 9.3 μm to obtain a second positive active material having a particle diameter of 9.3 μm or more.

The Dv10 obtained by the laser particle diameter tester is 2.50 μm, the Dv50 is 14.70 μm and the Dv90 is 28.50 μm. The value of (Dv90-Dv50)–(Dv50-Dv10) calculated according to equation (3) is 1.6. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Example 26

The method here is the same as the preparation method of Example 10, except that The each content of elements M in the first positive active material in Example 26 is 303 ppm, and a grinding process is performed to remove particles having a particle diameter of more than 11 μm to obtain a first positive active material having a particle diameter of 11 μm or less. The each content of elements N in the second positive active material is 292 ppm, and a grinding process is performed to remove particles having a particle diameter of less than 9.3 μm to obtain a second positive active material having a particle diameter of 9.3 μm or more.

The Dv10 obtained by the laser particle diameter tester is 2.50 μm, the Dv50 is 14.70 μm and the Dv90 is 28.50 μm. The value of (Dv90-Dv50)–(Dv50-Dv10) calculated according to equation (3) is 1.6. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 2.6.

Comparative Example 1

The method here is the same as the preparation method of Example 1, except that the elements M in the first positive active material in Comparative Example 1 are Mg, Al and Mn, and a grinding process is performed to remove particles having a particle diameter of more than 15 μm to obtain a first positive active material having a particle diameter of 15 μm or less. The elements N in the second positive active material are Mg, Al, Mn and Ni, and a grinding process is performed to remove particles having a particle diameter of less than 11 μm to obtain a first positive active material having a particle diameter of 11 μm or more.

The Dv10 obtained by the laser particle diameter tester is 5.70 μm, the Dv50 is 17.60 μm and the Dv90 is 32.90 μm. The value of (Dv90-Dv50)–(Dv50-Dv10) calculated according to equation (3) is 3.4. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8.

Comparative Example 2

The method here is the same as the preparation method of Example 1, except that the elements M in the first positive active material in Comparative Example 2 are Mg, Al and Mn, and a grinding process is performed to remove particles having a particle diameter of more than 11 μm to obtain a first positive active material having a particle diameter of 11 μm or less. The elements N in the second positive active material are Mg, Al, Mn and Ni, and a grinding process is performed to remove particles having a particle diameter of less than 10 μm to obtain a first positive active material having a particle diameter of 10 μm or more.

The Dv10 obtained by the laser particle diameter tester is 4.30 μm, the Dv50 is 15.70 μm and the Dv90 is 29.70 μm. The value of (Dv90-Dv50)–(Dv50-Dv10) calculated according to equation (3) is 2.6. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8.

Comparative Example 3

The method here is the same as the preparation method of Example 1, except that the elements M in the first positive active material in Comparative Example 3 are Mg, Al and Mn, and a grinding process is performed to remove particles having a particle diameter of more than 12 μm to obtain a first positive active material having a particle diameter of 12 μm or less. The elements N in the second positive active material are Mg, Al, Mn and Ni, and a grinding process is performed to remove particles having a particle diameter of less than 11 µm to obtain a first positive active material having a particle diameter of 11 µm or more.

The Dv10 obtained by the laser particle diameter tester is 7.10 µm, the Dv50 is 16.60 µm and the Dv90 is 30.40 µm. The value of (Dv90-Dv50)-(Dv50-Dv10) calculated according to equation (3) is 4.3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8.

Comparative Example 4

The method here is the same as the preparation method of Example 1, except that the elements M in the first positive active material in Comparative Example 4 are Mg, Al and Mn, and a grinding process is performed to remove particles having a particle diameter of more than 14 µm to obtain a first positive active material having a particle diameter of 14 µm or less. The elements N in the second positive active material are Mg, Al, Mn and Ni, and a grinding process is performed to remove particles having a particle diameter of less than 12 µm to obtain a first positive active material having a particle diameter of 12 µm or more.

The Dv10 obtained by the laser particle diameter tester is 6.60 µm, the Dv50 is 18.00 µm and the Dv90 is 33.20 µm. The value of (Dv90-Dv50)-(Dv50-Dv10) calculated according to equation (3) is 3.8. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8.

Comparative Example 5

The method here is the same as the preparation method of Example 1, except that the elements M in the first positive active material in Comparative Example 5 are Mg, Al and Mn, and a grinding process is performed to remove particles having a particle diameter of more than 18 µm to obtain a first positive active material having a particle diameter of 18 µm or less. The elements N in the second positive active material are Mg, Al, Mn and Ni, and a grinding process is performed to remove particles having a particle diameter of less than 16 µm to obtain a first positive active material having a particle diameter of 16 µm or more.

The Dv10 obtained by the laser particle diameter tester is 4.60 µm, the Dv50 is 18.20 µm and the Dv90 is 34.50 µm. The value of (Dv90-Dv50)-(Dv50-Dv10) calculated according to equation (3) is 2.7. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8.

Comparative Example 6

A solution containing a precipitating agent (sodium carbonate), a solution of a Co salt (cobalt sulfate) and a solution of a metal M salt (magnesium nitrate, aluminum nitrate, manganese nitrate, nickel nitrate) are cocurrent flowed and added into a reactor for fully mixing to obtain a precipitate by coprecipitation reaction; the precipitate is filtered, dried, and calcined at 780 to 1200° C. to form a precursor; subsequently, the precursor and lithium carbonate are mixed in a certain ratio, and calcined at 920 to 1200° C., wherein the element M is Mg, Al, Mn and Ni with a content of 209 ppm for each element M; a grinding process is performed to remove particles having a particle diameter of more than 9.5 µm to obtain a first positive active material having a particle diameter of 9.5 µm or less.

A solution containing a precipitating agent (sodium carbonate), a solution of a Co salt (cobalt sulfate) and a solution of a metal N salt (magnesium nitrate, aluminum nitrate, manganese nitrate, nickel nitrate) are cocurrent flowed and added into a reactor for fully mixing to obtain a precipitate by coprecipitation reaction; the precipitate is filtered, dried, and calcined at 780 to 1200° C. to form a precursor; subsequently, the precursor and lithium carbonate are mixed in a certain ratio, and calcined at 920 to 1200° C., wherein the element N is Mg, Al, Mn and Ni with a content of 263 ppm for each element N; then, a grinding process is performed to remove particles having a particle diameter of less than 8.6 µm to obtain a second positive active material having a particle diameter of 8.6 µm or more.

The first positive active material and the second positive active material described above are prepared into a lithium-ion battery according to the method in Example 1, and then the lithium-ion battery is disassembled to obtain a positive active material sample for testing.

The Dv10 obtained by the laser particle diameter tester is 5.20 µm, the Dv50 is 15.30 µm and the Dv90 is 28.40 µm. The value of (Dv90-Dv50)-(Dv50-Dv10) calculated according to equation (3) is 3. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8.

Comparative Example 7

A solution containing a precipitating agent (sodium carbonate), a solution of a Co salt (cobalt sulfate) and a solution of a metal M salt (magnesium nitrate, aluminum nitrate, manganese nitrate, nickel nitrate) are cocurrent flowed and added into a reactor for fully mixing to obtain a precipitate by coprecipitation reaction; the precipitate is filtered, dried, and calcined at 780 to 1200° C. to form a precursor; subsequently, the precursor and lithium carbonate are mixed in a certain ratio, and calcined at 920 to 1200° C., wherein the element M is Mg, Al, Mn and Ni with a contents of 223 ppm for each element M; a grinding process is performed to remove particles having a particle diameter of more than 12.3 µm to obtain a first positive active material having a particle diameter of 12.3 µm or less.

A solution containing a precipitating agent (sodium carbonate), a solution of a Co salt (cobalt sulfate) and a solution of a metal N salt (magnesium nitrate, aluminum nitrate, manganese nitrate, nickel nitrate) are cocurrent flowed and added into a reactor for fully mixing to obtain a precipitate by coprecipitation reaction; the precipitate is filtered, dried, and calcined at 780 to 1200° C. to form a precursor; subsequently, the precursor and lithium carbonate are mixed in a certain ratio, and calcined at 920 to 1200° C., wherein the element N is Mg, Al, Mn and Ni with a content of 249 ppm for each element N; then, a grinding process is performed to remove particles having a particle diameter of less than 10.3 µm to obtain a second positive active material having a particle diameter of 10.3 µm or more.

The first positive active material and the second positive active material described above are prepared into a lithium-ion battery according to the method in Example 1, and then the lithium-ion battery is disassembled to obtain a positive active material sample for testing.

The Dv10 obtained by the laser particle diameter tester is 8.37 μm, the Dv50 is 17.98 μm and the Dv90 is 32.40 μm. The value of (Dv90-Dv50)−(Dv50-Dv10) calculated according to equation (3) is 4.81. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8.

Comparative Example 8

A solution containing a precipitating agent (sodium carbonate), a solution of a Co salt (cobalt sulfate) and a solution of a metal M salt (magnesium nitrate, aluminum nitrate, manganese nitrate, nickel nitrate) are combined and added into a reactor for fully mixing to obtain a precipitate by coprecipitation reaction; the precipitate is filtered, dried, and calcined at 780 to 1200° C. to form a precursor; subsequently, the precursor and lithium carbonate are mixed in a certain ratio, and calcined at 920 to 1200° C., wherein the element M is Mg, Al, Mn and Ni with a content of 221 ppm for each element M; a grinding process is performed to remove particles having a particle diameter of more than 11.8 μm to obtain a first positive active material having a particle diameter of 11.8 μm or less.

A solution containing a precipitating agent (sodium carbonate), a solution of a Co salt (cobalt sulfate) and a solution of a metal N salt (magnesium nitrate, aluminum nitrate, manganese nitrate, nickel nitrate) are cocurrent flowed and added into a reactor for fully mixing to obtain a precipitate by coprecipitation reaction; the precipitate is filtered, dried, and calcined at 780 to 1200° C. to form a precursor; subsequently, the precursor and lithium carbonate are mixed in a certain ratio, and calcined at 920 to 1200° C., wherein the element N is Mg, Al, Mn and Ni with a content of 239 ppm for each element N; then, a grinding process is performed to remove particles having a particle diameter of less than 9.7 μm to obtain a second positive active material having a particle diameter of 9.7 μm or more.

The first positive active material and the second positive active material described above are prepared into a lithium-ion battery according to the method in Example 1, and then the lithium-ion battery is disassembled to obtain a positive active material sample for testing.

The Dv10 obtained by the laser particle diameter tester is 6.40 μm, the Dv50 is 16.50 μm and the Dv90 is 30.60 μm. The value of (Dv90-Dv50)−(Dv50-Dv10) calculated according to equation (3) is 4. The content of the element Co and the total content of the element M in the first particle and the content of the element Co and the total content of the element N in the second particle are respectively detected by ICP (Inductively Coupled Plasma Spectrometer). The value of (a/b)/(c/d) calculated according to equation (1) is 0.8.

The following are the test methods for related parameters:

1. Compact Density of Positive Electrode

The formed lithium-ion battery is discharged to 2.5 to 3.0V, then the lithium-ion battery is disassembled to take out the positive electrode; the positive electrode is placed in DMC and soaked for 2 hours, and dried naturally in the drying room; 6 pieces of the positive electrode and the positive electrode current collector are punched out with a mold of 154.025 mm$^2$; the analytical balance (Shanghai Jingke Tianmei Electronic Balance, FA2004B) is used to weigh the total weight of 6 pieces of positive electrodes as Mc g and the total weight of the 6 pieces of positive electrode current collectors as Ma g; a micrometer (Japan Mitutoyo micrometer, 293-230) is used to measure the average thickness of the 6 pieces of positive electrodes as T1 mm and the average thickness of the 6 pieces of positive electrode current collectors as T2 mm, so PD=[(Mc−Ma)/6]/(T1−T2)/154.025*1000, g/cm$^3$, wherein PD indicates the compact density of the positive electrode. The compact density of the positive electrode measured by the testing method is the compact density after pressing.

2. Initial Discharge Capacity of Lithium-Ion Battery

After the lithium-ion battery is formed, it is charged with a constant current of 0.5 C to a voltage of 4.4 V at a room temperature, and then charged with a constant voltage of 4.4 V until the current is 0.05 C. The discharge capacity at a discharge of 0.2 C is measured, and the standard capacity is 2990 mAh.

3. Discharge Capacity at 500 Cycles

After the lithium-ion battery is formed, it is charged with a constant current of 0.5 C to a voltage of 4.4 V at a room temperature, and discharged with a constant voltage of 4.4 V until the current is 0.05 C, and discharged with 0.2 C. After 500 cycles, the ratio of the amount of electricity discharged at the 500th cycle to the initial discharge capacity is calculated, 1C=2990 mAh.

4. DSC (Differential Scanning Calorimetry) Initial Peak of Initial Peak of Heat Loss After the lithium-ion battery is formed, it is charged with a constant current of 0.5 C to a voltage of 4.4 V at a room temperature, and then charged with a constant voltage of 4.4 V until the current is 0.05 C. Then, the lithium-ion battery is disassembled in a dry room, and the fully charged positive electrode is taken as a test sample. The sample is subjected to DSC testing using a Netzsch STA449 DSC/TGA (Germany STA449F3) with a test temperature of 50-450° C.

The compact density, the initial discharge capacity, the discharge capacity at 500 cycles, and initial peak of initial peak of heat loss for the DSC test are tested for each of the samples of Examples 1-26 and Comparative Examples 1-8, and the testing methods are respectively determined according to the above-described measurement methods for compact density, test method of initial discharge capacity, the discharge capacity at 500 cycles, and initial peak of initial peak of heat loss for the DSC test.

The measurement results of the Examples 1-26 and Comparative Examples 1-8 are shown in Table 1 below.

TABLE 1

| | Parameters of examples and comparative examples parameters of the present application | | | | | | | performance of lithium-ion battery | | | thermal stability |
|---|---|---|---|---|---|---|---|---|---|---|---|
| | doping element in first particle | doping element in second particle | (a/b)/ (c/d) = ad/bc | particle size (μm) DV10 | DV50 | DV90 | particle size distribution (D90 − D50) − (D50 − D10) | compact density of positive electrode (g/cm³) | initial discharge capacity (mAh) | discharge capacity at the 500th cycles (%) | of material DSC test main peak of initial heat loss peak ° C. |
| Examples | | | | | | | | | | | |
| 1 | Mg, Al | Al | 0.8 | 5.70 | 17.60 | 32.90 | 3.4 | 4.13 | 3104 | 83.7 | 237.9 |
| 2 | Al, Ti | Mg | 0.8 | 5.70 | 17.60 | 32.90 | 3.4 | 4.09 | 3125 | 82.5 | 236.4 |
| 3 | Mg, Al, Ti | Mg, Al | 0.8 | 5.70 | 17.60 | 32.90 | 3.4 | 4.02 | 3136 | 82.8 | 234.2 |
| 4 | Mg, Al, Ti, Mn | Mg, Al | 0.8 | 5.70 | 17.60 | 32.90 | 3.4 | 4.05 | 3117 | 82.9 | 237.5 |
| 5 | Mg, Al, Ni, Mn, Zr | Mg, Al, Mn | 0.8 | 5.70 | 17.60 | 32.90 | 3.4 | 3.92 | 3152 | 82.5 | 235.7 |
| 6 | Mg, Al, Ti, Ni, Mn | Mg, Ti | 0.8 | 5.70 | 17.60 | 32.90 | 3.4 | 3.96 | 3144 | 82.9 | 234.4 |
| 7 | Mg, Al, Ti, Ni, Mn | Mg, Al, Mn | 0.8 | 5.70 | 17.60 | 32.90 | 3.4 | 3.98 | 3131 | 82.3 | 235.8 |
| 8 | Mg, Al, Ni, Mn, Ti, Zr | Mg, Al, Ni, Mn | 0.8 | 5.70 | 17.60 | 32.90 | 3.4 | 4.04 | 3108 | 82.5 | 236.7 |
| 9 | Mg, Al, Ni, Mn, Ti, Zr, La | Mg, Al, Mn | 0.8 | 5.70 | 17.60 | 32.90 | 3.4 | 4.1 | 3119 | 82.9 | 235.2 |
| 10 | Mg, Al, Ni, Mn, Ti, Zr, La | Mg, Al, Ni, Mn | 0.8 | 5.70 | 17.60 | 32.90 | 3.4 | 3.92 | 3122 | 83.6 | 237.9 |
| 11 | Mg, Al, Ti, Ni, Mn | Mg, Al, Mn | 1.2 | 5.20 | 15.30 | 28.40 | 3 | 3.98 | 3134 | 85.4 | 256.7 |
| 12 | Mg, Al, Ti, Ni, Mn | Mg, Al, Mn | 3.7 | 5.20 | 15.30 | 28.40 | 3 | 3.95 | 3107 | 84.5 | 256.3 |
| 13 | Mg, Al, Ti, Ni, Mn | Mg, Al, Mn | 6.9 | 5.20 | 15.30 | 28.40 | 3 | 3.93 | 3125 | 86.8 | 253.6 |
| 14 | Mg, Al, Ti, Ni, Mn | Mg, Al, Mn | 9.5 | 5.20 | 15.30 | 28.40 | 3 | 4 | 3010 | 89.6 | 257.5 |
| 15 | Mg, Al, Ti, Ni, Mn | Mg, Al, Mn | 16.9 | 5.20 | 15.30 | 28.40 | 3 | 4.01 | 3018 | 89.5 | 259.3 |
| 16 | Mg, Al, Ti, Ni, Mn | Mg, Al, Mn | 23.6 | 5.20 | 15.30 | 28.40 | 3 | 4.02 | 3011 | 85.7 | 259.7 |
| 17 | Mg, Al | Al | 2.6 | 2.5 | 14.7 | 28.5 | 1.6 | 4.13 | 3152 | 86.7 | 253.8 |
| 18 | Al, Ti | Mg | 2.6 | 1.9 | 11.5 | 23.5 | 2.4 | 4.1 | 3144 | 87.3 | 255.2 |
| 19 | Mg, Al, Ti | Mg, Al | 2.6 | 2.7 | 17.2 | 26.4 | −5.3 | 4.03 | 3131 | 87.4 | 259.6 |
| 20 | Mg, Al, Ti, Mn | Mg, Al | 2.6 | 2.5 | 14.7 | 28.5 | 1.6 | 4.06 | 3108 | 85.1 | 253.5 |
| 21 | Mg, Al, Ni, Mn, Zr | Mg, Al, Mn | 2.6 | 3.7 | 17.2 | 32.0 | 1.3 | 4.03 | 3119 | 85.6 | 260.1 |
| 22 | Mg, Al, Ti, Ni, Mn | Mg, Ti | 2.6 | 4.1 | 18.5 | 32.9 | 0.0 | 4.07 | 3122 | 86.5 | 257.2 |
| 23 | Mg, Al, Ti, Ni, Mn | Mg, Al, Mn | 2.6 | 1.5 | 9.7 | 20.2 | 2.3 | 4.11 | 3134 | 87.3 | 256.2 |
| 24 | Mg, Al, Ni, Mn, Ti, Zr | Mg, Al, Ni, Mn | 2.6 | 3.2 | 17.0 | 33.3 | 2.5 | 4.1 | 3107 | 88.4 | 261 |
| 25 | Mg, Al, Ni, Mn, Ti, Zr, La | Mg, Al, Mn | 2.6 | 2.5 | 14.7 | 28.5 | 1.6 | 4.11 | 3125 | 89.7 | 259.3 |

TABLE 1-continued

| | Parameters of examples and comparative examples parameters of the present application | | | | | | performance of lithium-ion battery | | | thermal stability |
|---|---|---|---|---|---|---|---|---|---|---|
| | doping element in first particle | doping element in second particle | (a/b)/ (c/d) = ad/bc | particle size (μm) DV10 | DV50 | DV90 | particle size distribution (D90 − D50) − (D50 − D10) | compact density of positive electrode (g/cm³) | initial discharge capacity (mAh) | discharge capacity at the 500th cycles (%) | of material DSC test main peak of initial heat loss peak ° C. |
| 26 | Mg, Al, Ni, Mn, Ti, Zr, La | Mg, Al, Ni, Mn | 2.6 | 2.5 | 14.7 | 28.5 | 1.6 | 4.08 | 3010 | 87.3 | 254.2 |
| Comparative Examples | | | | | | | | | | | |
| 1 | Mg, Al, Mn | Mg, Al, Mn, Ni | 0.8 | 5.70 | 17.60 | 32.90 | 3.4 | 3.89 | 2990 | 80.1 | 222.7 |
| 2 | Mg, Al, Mn | Mg, Al, Mn, Ni | 0.8 | 4.30 | 15.70 | 29.70 | 2.6 | 3.81 | 2998 | 81.1 | 221.3 |
| 3 | Mg, Al, Mn | Mg, Al, Mn, Ni | 0.8 | 7.10 | 16.60 | 30.40 | 4.3 | 3.89 | 2977 | 80.7 | 220.1 |
| 4 | Mg, Al, Mn | Mg, Al, Mn, Ni | 0.8 | 6.60 | 18.00 | 33.20 | 3.8 | 3.83 | 3006 | 80.8 | 223.1 |
| 5 | Mg, Al, Mn | Mg, Al, Mn, Ni | 0.8 | 4.60 | 18.20 | 34.50 | 2.7 | 3.82 | 3001 | 81.8 | 227.2 |
| 6 | Mg, Al, Mn, Ni | Mg, Al, Mn, Ni | 0.8 | 5.20 | 15.30 | 28.40 | 3 | 3.8 | 2995 | 81.4 | 212 |
| 7 | Mg, Al, Mn, Ni | Mg, Al, Mn, Ni | 0.8 | 8.37 | 17.98 | 32.40 | 4.81 | 3.83 | 2998 | 81.1 | 219.4 |
| 8 | Mg, Al, Mn, Ni | Mg, Al, Mn, Ni | 0.8 | 6.40 | 16.50 | 30.60 | 4 | 3.85 | 3004 | 81.7 | 227.7 |

From the experimental data in Table 1, by comparing the results of Examples 1-26 and Comparative Examples 1-8, it shows that: when the number of the type of the element M in the first particle of the positive active material is larger than that of the element N in the second particle, the initial discharge capacity of the lithium-ion battery is high, the discharge capacity at the 500th cycles is increased, and the thermal stability of the positive electrode is improved.

By comparing the results of Examples 1-10 and 11-16, it may be known that: when the number of the type of the element M in the first particle of the positive active material is larger than that of the element N in the second particle, the discharge capacity at the 500th cycles of the lithium-ion battery is effectively improved and the thermal stability of the positive electrode is higher when the total content of the element M and the content of the element Co in the first particle and the total content of the element N and the content of the element Co in the second particle meet the equation (2) or (3) in the case where (Dv90-Dv50)−(Dv50-Dv10)≤2.5 is not met.

By comparing the results of Examples 11-16 and 17-26, it may be known that: when the number of the type of the element M in the first particle of the positive active material is larger than that of the element N in the second particle while meeting (Dv90-Dv50)−(Dv50-Dv10)≤2.5, the compact density of the lithium-ion battery is improved and the energy density of the positive electrode is higher when the total content of the element M and the content of the element Co in the first particle and the total content of the element N and the content of the element Co in the second particle meet the equation (2) or (3).

Figure 1B:
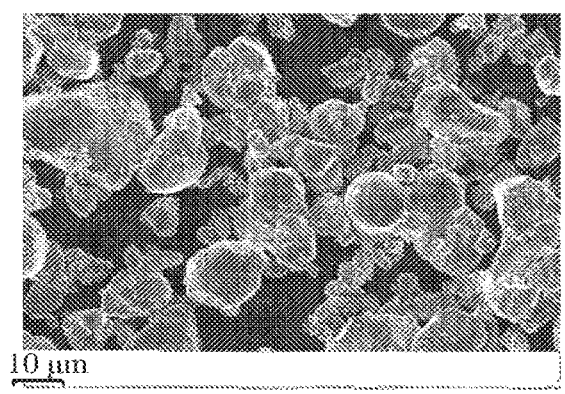
FIG. 1B shows a scanning electron microscope (SEM) comparison view of the positive active material according to Comparative Example 6.

Furthermore, FIG. 1 shows a scanning electron microscope (SEM) comparison view of the positive active material according to Example 1 of the present application and Comparative Example 6. As can be seen from FIG. 1, comparing with the positive active material of Comparative Example 6, the positive active material of Example 1 was mixed with a smaller first particle and a larger second particle, which is a stacking of the smaller particle and the larger particle, thus the compact density of the positive electrode can be improved.

Figure 2:
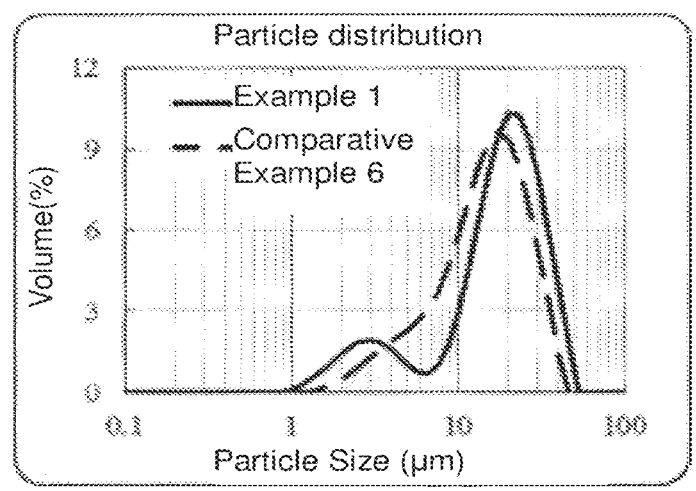
FIG. 2 shows a particle size distribution curve of the positive active material according to Example 1 of the present application and Comparative Example 6.

FIG. 2 shows a particle size distribution curve of the positive active material according to Example 1 of the present application and Comparative Example 6. As can be seen from FIG. 2, the positive active material of Example 1 has a distinct double peak compared to the single peak of Comparative Example 6, and the peak height of the second peak is greater than the peak height of the first peak.

Figure 3:
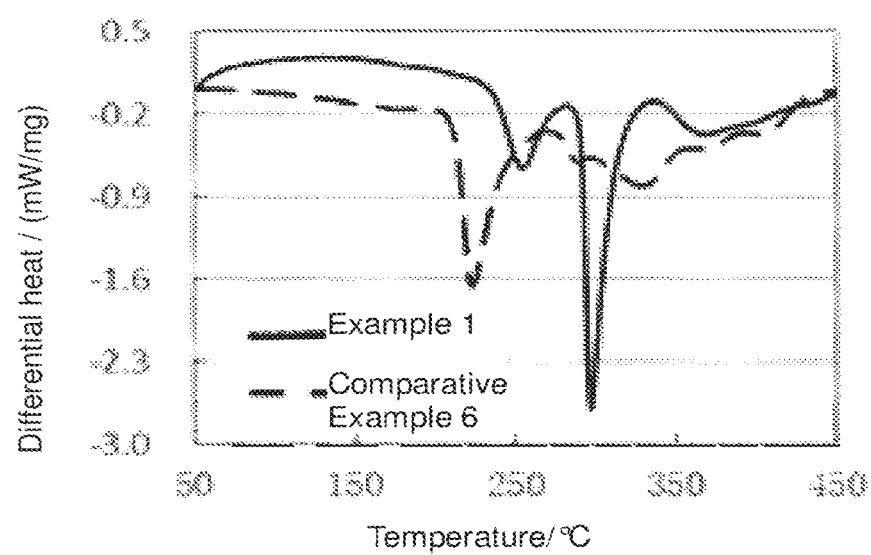
FIG. 3 shows the results of testing thermal stability of electrode for the positive active material according to Example 1 of the present application and Comparative Example 6.

FIG. 3 shows the results of testing thermal stability of electrode for the positive active material according to Example 1 of the present application and Comparative Example 6. As can be seen from FIG. 3, the temperature (254.5° C.) of main peak of initial heat loss peak of the sample in Example 1 is significantly higher than that (223.1° C.) of the sample in Comparative Example 6, indicating that the thermal stability of the sample in Example 1 is higher than that in Comparative Example 6.

Those skilled in the art will appreciate that the above-described examples are merely exemplary examples, and various changes, substitutions and changes may be made without departing from the spirit and scope of the present application.

What is claimed is:

1. A positive active material, comprising: a first particle and a second particle, the first particle has a chemical formula of $Li_eCo_gM_{1-g}O_{2-i}$, and the second particle has a chemical formula of $Li_fCo_hN_{1-h}O_{2-j}$, the element M includes at least two selected from the group consisting of Ni, Mn, Al, Mg, Ti, La, Y and Zr; the element N includes at least one selected from the group consisting of Ni, Mn, Al, Mg, Ti, La, Y and Zr; and $0.8 \leq e \leq 1.2$, $0 < g < 1$, $-0.1 \leq i \leq 0.2$, $0.8 \leq f \leq 1.2$, $0 < h < 1$, $-0.1 \leq j \leq 0.2$, the number of types of the element M in the first particle is greater than the number of types of the element N in the second particles, wherein a particle diameter of the positive active material meets the following formula (3):

$$(Dv90-Dv50)-(Dv50-Dv10) \leq 2.5 \qquad \text{equation (3)}$$

Dv90 refers to a particle diameter reaching a volume accumulation of 90% from the small particle diameter side in the volume-based particle size distribution, Dv50 refers to a particle diameter reaching a volume accumulation of 50% from the small particle diameter side in the volume-based particle size distribution, Dv10 refers to a particle diameter reaching a volume accumulation of 10% from the small particle diameter side in the volume-based particle size distribution;

wherein Dv90 is within the range of 20.2 μm to 32.9 μm.

2. The positive active material according to claim 1, wherein the first particle has a chemical formula of $Li_nCo_xM_{1-x}O_{2-y}$, and the second particle has a chemical formula of $Li_nCo_xN_{1-x}O_{2-y}$, and $0.8 \leq n \leq 1.2$, $0 < x < 1$, $-0.1 \leq y \leq 0.2$.

3. The positive active material according to claim 1, wherein the particle diameter of the first particle is smaller than the particle diameter of the second particle.

4. The positive active material according to claim 3, wherein the particle diameter of the first particle is smaller than Dv50 of the positive active material, and the particle diameter of the second particle is larger than Dv50 of the positive active material.

5. The positive active material according to claim 1, wherein each of the elements M is contained in the first particle in an amount of more than 200 ppm, and each of the elements N is contained in the second particle in an amount of more than 200 ppm.

6. The positive active material according to claim 1, wherein the positive active material meets the following formula (1):

$$(a/b)/(c/d) > 1 \qquad \text{equation (1)}$$

a represents the total mass of the element M in the first particle;
b represents the mass of the element Co in the first particle;
c represents the total mass of the element N in the second particle;
d represents the mass of the element Co in the second particle.

7. The positive active material according to claim 1, wherein the positive active material meets the following formula (2):

$$(A/B)/(C/D) > 1 \qquad \text{equation (2)}$$

A represents the total molar amount of the element M in the first particle;
B represents the molar amount of the element Co in the first particle;
C represents the total molar amount of the element N in the second particle;
D represents the molar amount of the element Co in the second particle.

8. The positive active material according to claim 6, wherein the positive active material has a value of (a/b)/(c/d) of 1.3 to 10.

9. The positive active material according to claim 1, wherein the volume-based particle size distribution curve of the positive active material comprises a first peak and a second peak.

10. The positive active material according to claim 9, wherein the peak height of the second peak is greater than the peak height of the first peak.

11. A positive electrode, wherein comprising a positive active material, the positive active material comprising a first particle and a second particle, wherein the first particle has a chemical formula of $Li_eCo_gM_{1-g}O_{2-i}$, and the second particle has a chemical formula of $Li_fCo_hN_{1-h}O_{2-j}$, the element M includes at least two selected from the group consisting of Ni, Mn, Al, Mg, Ti, La, Y and Zr; the element N includes at least one selected from the group consisting of Ni, Mn, Al, Mg, Ti, La, Y and Zr; and $0.8 \leq e \leq 1.2$, $0 < g < 1$, $-0.1 \leq i \leq 0.2$, $0.8 \leq f \leq 1.2$, $0 < h < 1$, $-0.1 \leq j \leq 0.2$, the number of types of the element M in the first particle is greater than the number of types of the element N in the second particles, wherein the particle diameter of the positive active material meets the following formula (3):

$$(Dv90-Dv50)-(Dv50-Dv10) \leq 2.5 \qquad \text{equation (3)}$$

Dv90 refers to a particle diameter reaching a volume accumulation of 90% from the small particle diameter side in the volume-based particle size distribution, Dv50 refers to a particle diameter reaching a volume accumulation of 50% from the small particle diameter side in the volume-based particle size distribution, Dv10 refers to a particle diameter reaching a volume accumulation of 10% from the small particle diameter side in the volume-based particle size distribution;

wherein Dv90 is within the range of 20.2 μm to 32.9 μm.

12. The positive electrode according to claim 11, wherein the particle diameter of the first particle is smaller than the particle diameter of the second particle.

13. The positive electrode according to claim 12, wherein the particle diameter of the first particle is smaller than Dv50 of the positive active material, and the particle diameter of the second particle is larger than Dv50 of the positive active material.

14. The positive electrode according to claim 11, wherein each of the elements M is contained in the first particle in an amount of more than 200 ppm, and each of the elements N is contained in the second particle in an amount of more than 200 ppm.

15. The positive electrode according to claim 11, wherein the positive active material meets the following formula (1):

$$(a/b)/(c/d) > 1 \qquad \text{equation (1)}$$

a represents the total mass of the element M in the first particle;
b represents the mass of the element Co in the first particle;
c represents the total mass of the element N in the second particle;
d represents the mass of the element Co in the second particle.

16. The positive electrode according to claim 11, wherein the positive active material meets the following formula (2):

$$(A/B)/(C/D) > 1 \qquad \text{equation (2)}$$

A represents the total molar amount of the element M in the first particle;
B represents the molar amount of the element Co in the first particle;
C represents the total molar amount of the element N in the second particle;
D represents the molar amount of the element Co in the second particle.

17. A lithium-ion battery, wherein comprising a positive electrode with a positive active material, wherein the positive active material comprising a first particle and a second particle, wherein the first particle has a chemical formula of $Li_eCo_gM_{1-g}O_{2-i}$, and the second particle has a chemical formula of $Li_fCo_hN_{1-h}O_{2-j}$, the element M includes at least two selected from the group consisting of Ni, Mn, Al, Mg, Ti, La, Y and Zr; the element N includes at least one selected from the group consisting of Ni, Mn, Al, Mg, Ti, La, Y and Zr; and $0.8 \le e \le 1.2$, $0 < g < 1$, $-0.1 \le i \le 0.2$, $0.8 \le f \le 1.2$, $0 < h < 1$, $-0.1 \le j \le 0.2$, the number of types of the element M in the first particle is greater than the number of types of the element N in the second particles, wherein the particle diameter of the positive active material meets the following formula (3):

$$(Dv90-Dv50)-(Dv50-Dv10) \le 2.5 \quad \text{equation (3)}$$

Dv90 refers to a particle diameter reaching a volume accumulation of 90% from the small particle diameter side in the volume-based particle size distribution, Dv50 refers to a particle diameter reaching a volume accumulation of 50% from the small particle diameter side in the volume-based particle size distribution, Dv10 refers to a particle diameter reaching a volume accumulation of 10% from the small particle diameter side in the volume-based particle size distribution; wherein Dv90 is within the range of 20.2 μm to 32.9 μm.

18. The lithium-ion battery according to claim 17, wherein a compact density of the positive electrode is $\ge 3.9$ g/cm$^3$.

19. The lithium-ion battery according to claim 17, wherein the particle diameter of the first particle is smaller than the particle diameter of the second particle.

* * * * *